July 30, 1963  J. W. PIECZYNSKI  3,099,758
SELF-POWERED INTERVAL TIMER
Filed Sept. 16, 1960  2 Sheets-Sheet 1

Joseph W. Pieczynski
INVENTOR.

BY *[signatures]*
Attorneys

Joseph W. Pieczynski
INVENTOR.

United States Patent Office 3,099,758
Patented July 30, 1963

3,099,758
SELF-POWERED INTERVAL TIMER
Joseph W. Pieczynski, Baltimore, Md., assignor to Electronic Products Corp., Baltimore, Md., a corporation
Filed Sept. 16, 1960, Ser. No. 56,487
16 Claims. (Cl. 307—141.8)

This invention relates generally to electronic timers and more particularly to improved power supply means for electronic interval timers.

Several known interval timers are available on the commercial market employing transistors which permit the timers to be substantially miniaturized. Miniature interval timers of this type are employed in many commercoal and military applications. Ground support equipment, ground operation equipment, simulation equipment, weapon systems, training devices, automation equipment, and many other systems and apparatus therefor employ interval timers. Presently available timers have certain deficiencies which render them unsuitable in many applications. For example, transistorized interval timers have suffered from supply voltage fluctuations and random noise on the input signal. It will be appreciated that where accurate timing is necessary, input variations can vary the timer operation considerably and thereby cause the entire system within which the timer is contained to function improperly.

In the light of the above, it is the principal object of this invention to provide an improved transistorized interval timer including a self-contained power supply means therefor which is insensitive to external voltage fluctuations and random noise. It is the contemplation of this invention to employ small, reliable, rechargeable batteries for supplying a constant voltage to the timer circuit.

It is a more particular object of this invention to provide in combination with an interval timer circuit, novel power supply means therefor including a rechargeable battery with means for applying a trickle charge to the battery during periods when the battery power supply need not be connected to the timer circuit input. The timer operation is generally initiated by the application of a starting pulse. In accordance with the present invention, a starting pulse is applied to switching means for disconnecting the rechargeable battery from the charging circuit and connecting the battery to the timer circuit input.

It is a still more particular object of this invention to provide in combination with an interval timer, power supply means therefor including a small, reliable, rechargeable battery, thereby eliminating the adverse effects of external supply voltage fluctuations and random signal input noise. By so providing the battery power supply, the interval timer now is operated from its own internal voltage source, free from noise and voltage fluctuation previously causing this type of timer to fire prematurely.

It is a still further object of this invention to provide a novel interval timer construction wherein all of the elements thereof are completely embedded in a solid insulative housing so as to prevent shock and vibrations from adversely effecting the circuit components.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 5:
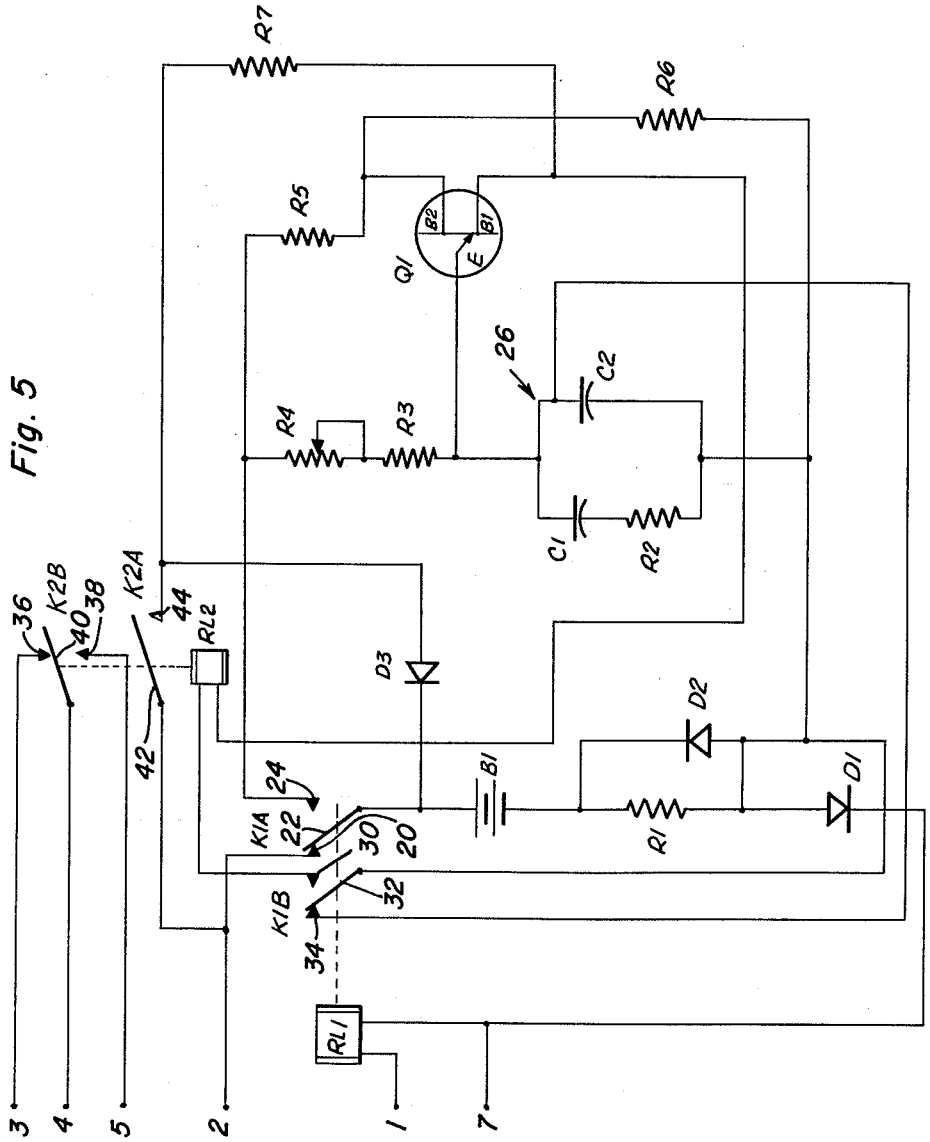
FIGURE 5 is a schematic wiring diagram of the novel power supply and timer circuit.

With continuing reference to the drawings, initial attention is called to the circuit diagram of FIGURE 5. In describing the circuit, exemplary values will be mentioned for several of the components. However, it is to be appreciated that the claimed invention is not to be restricted to the valves mentioned inasmuch as they are subject to design considerations by one skilled in the art. Six external pins of a ten pin timer header, are shown in FIGURE 5. The circuit is shown with the switches therein in their normal or deactivated position. Connected between pins 2 and 7 is the charging circuit including charge controlling switch section K–1A of an input signal responsive device which also includes the switch section K–1B and switch actuating relay coil RL–1. Switch section K–1A includes a fixed contact 20 adapted to be normally engaged by movable contact 22. The switch section includes a second fixed contact 24 which is engaged by movable contact 22 when the switch section is energized in response to energization of relay coil RL–1 connected to pin 1. Serially connected with the movable contact 22 is battery B–1 which is a small reliable rechargeable nickel-cadmium type of battery comprising a pair of serially connected Gulton batteries, type 7VO–.080 to form a supply source of 16.8 volts. Serially connected with the battery B–1 is a resistor R–1 and a diode D–1 which in turn is connected to pin 7. Also, as noted, relay RL–1 is connected between pin 1 and diode D–1. A diode D–2 is connected parallel to a resistor R–1. Connected to the fixed contact 24, constituting the timer circuit input, is variable Resistor R–4 which is connected in series with R–3 which in turn is connected in series with time charging circuit 26 comprising a series branch including capacitor C–1 and resistor R–2 in parallel with a second branch comprising capacitor C–2. A unijunction transistor Q–1 has its emitter E connected between the charging circuit 26 and resistor R–3. Base B–2 is connected to contact 24 through resistor R–5 while base B–1 is connected through resistor R–7 and relay holding switch section K–2A to pin 2. Resistor R–6 is connected between the junction of base B–2 and resistor R–5 to the junction between the back-to-back diodes D–1 and D–2. Relay coil RL–2 is connected between base B–1 and fixed contact 30 of conditioning switch section K–1B. Movable contact 32 of switch section K–1B is normally connected to fixed contact 34 connected as noted between capacitors C–1 and C–2 to render the timing circuit 26 inoperative by shorting thereof and the relay circuit for RL–2 open. It is to be appreciated that switch sections K–1A and K–1B are shown in their normal position and are movable to the opposite position (not shown) in response to the energization of relay coil RL–1 whereupon K–1B operatively conditions both the timing circuit and the relay circuit. Switch sections K–2A and K–2B, the latter connected as shown between pins 3, 4 and 5, are responsive to the energization of relay coil RL–2. Switch section K–2B includes fixed contact 36 connected to pin 3 and fixed contact 38 connected to pin 5. In response to the energization of relay coil RL–2, the movable contact 40 moves out of engagement with contact 36 into engagement with contact 38 in order to control an external circuit through terminals 3, 4 and 5 while switch K–2A is operative to establish a relay holding circuit so as to prevent the relay coil RL-2 from imposing a current drain on the timer circuit.

In operation, a plus 22 to 32 volt D.C. external supply is connected to pin 2 with pin 7 being connected to the external supply common. This applied voltage while effective to maintain a trickle charge through the internal battery B-1 of 2 to 5 milliamps with resistor R-1 being 2.2 ohms is because of its fluctuating nature, isolated from the timer circuit. To initiate operation of the timer, a starting pulse is applied to pin 1, the pulse being approximately 22-32 volts D.C. The starting pulse of course energizes relay coil RL-1. Energization of relay coil RL-1 throws switch sections K-1A and K-1B to their energized positions with movable contact 22 engaging contact 24 and movable contacts 32 engaging contact 30 respectively. The shorting circuit established across capacitor C-1 and C-2 by the switch K-1B therefore opens and the charging circuit through the battery B-1 from the external supply likewise opens with the battery voltage discharging as applied for a limited interval only, to the timer circuit input. When the battery B-1 is applied to the timing circuit through contact 24, the capacitor C-1 and C-2 begins to charge at an exponential rate through resistors R-3 and R-4. Resistor R-3 being 10K ohms and resistor R-4 variable up to 500K ohms. When the voltage across the capacitor C-1 and C-2 reaches a level after a predetermined timing interval determined by equation $V_e = NV_{bb}$, (where $V_e$ is the potential stored, $V_{bb}$ the triggering potential for transistor $Q_1$ and N the transformation function) the transistor gates on and the stored charge of the two capacitors C-1 and C-2 discharges through E-B1 and relay coil RL-2, energizing contacts K-2A and K-2B to the position opposite to that shown in the drawings. It will be appreciated that relay coil RL-2 is held energized through section K-2A energized from the external supply connected to pin 2. The external circuit controlling switch section K-2B operates in response to the energization of coil RL-2 also opening the completed circuit across pins 3 and 4 and closing the normally open circuit between pins 4 and 5. As long as coil RL-2 remains energized, the external supply providing a trickle charge to the battery will be reestablished by another battery charging circuit completed during the timing cycle following the timing interval through closed contact 42 and 44 of switch section K-2A, through diode D-3, through battery B-1, resistor R-1, and diode D-1.

When the input signal is removed from coil RL-1, sections K-1A and K-1B move to their normal position shown in the drawings because of deenergization of relay RL-1, thereby opening the circuit through relay coil RL-2. Since the circuit has returned to its original state, the battery charging circuit goes back across the external supply under a trickle charge through switch K1A. The purpose of resitsor R-1 is to assure proper trickle current to the battery. Diode D-1 is to prevent any external short across pins 2 and 7 from shorting the battery out causing it to lose its non-fluctuating characteristic because of any severe fluctuations in the external source. Diode D-3 is to place the battery under a trickle charge while relay coil RL-2 is energized during the timing cycle. This would assure battery operation under these conditions (RL-2 energized) for a prolonged period. Diode D-2 is to block any current from the external supply from prematurely energizing coil RL-2 while the timer is in an off condition because of any high voltage fluctuation of the external source. Resistor R-4 is variable and is used to externally adjust the circuit timing. Resistor R-3 is to assure that in the event resistor R-4 is set to its minimum value, capacitors C-1 and C-2 are not a short across the battery B-1 when the input pulse energizes coil RL-1. Resistor R-7 is for the purpose of dropping the external supply voltage applied to coil RL-2 through its holding contact and switch sections K-2A. Resistors R-5 being 82 ohms and R-6 being 82K-ohms form a voltage divider to apply to the B-2 of Q-1 sufficient voltage to operate. Resistor R-7 has a value of 820 ohms.

Figure 3:
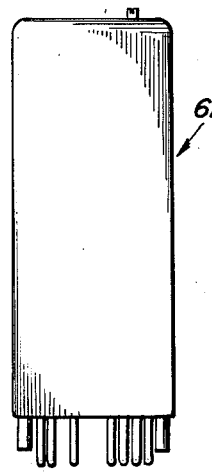
FIGURE 3 is an end elevational view further illustrating the external appearance of the invention.
Figure 1:
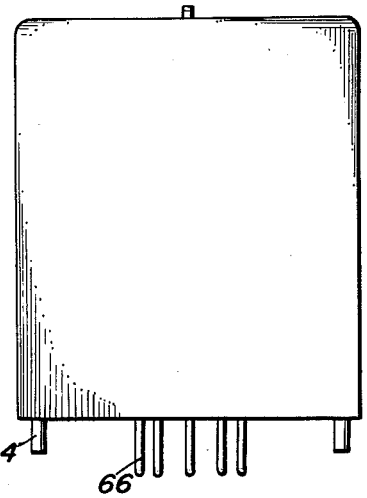
FIGURE 1 is a front elevational view of the invention showing the external appearance thereof.
Figure 4:
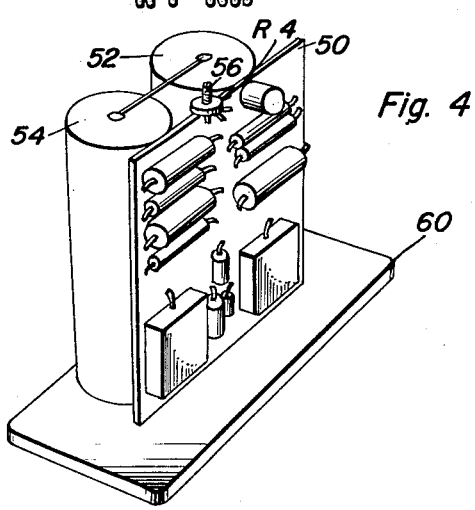
FIGURE 4 is a perspective view of the circuit components mounted on a printed board secured to a base, the entire structure adapted to be embedded in a solid insulative housing.
Figure 2:
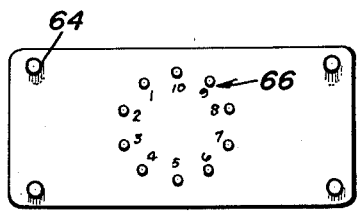
FIGURE 2 is a bottom plan view of the invention particularly showing the disposition of the external connecting pins.

In the construction of the timer, all of the components are mounted on a printed circuit board 50 shown in FIGURE 4. The battery B-1 may comprise a pair of units 52 and 54 connected in series or may be a single unit of appropriate voltage. The resistors and capacitors may be mounted on the side of the board 50 opposite to the battery unit 52 and 54 with their arrangement depending principally on appropriate packaging techniques. The only component location which is at all critical is that of resistor R-4 which includes a removable actuator 56 which must extend externally of the unit for adjustment. The board 50 is secured perpendicularly to a base 60 as shown.

In order to assure long, reliable, and durable operation of the timer circuit, it is desirable that the base 60, board 50 and all the components thereof be embedded in an insulative housing. It is contemplated that the size of the timer be approximately two and one-quarter by one and five-eighths by two and one-eighths in dimension. The housing is generally designated by the numeral 62 and is preferably substantially rectangular in cross-section but of course the particular shape thereof is subject to engineering considerations. The components on the board 50 are to be completely sealed and filled with a chemical which will cause complete embeddment of all of the components. The actuator 56 of resistor R-4 is however to extend through an opening in the housing 62 for permitting external time adjustment to permit the timer to be set to any points within its operating limits.

The housing 62 may be mounted to any existing structure. The mounting means may comprise threaded mounting studs 64 extending from the bottom housing surface. Wiring of the timer into any existing circuit may be accomplished by a ten pin solder hook header on the stud side of the timer or by any type of pin arrangement 66 suitable to the particular use.

The battery B-1 comprises a small nickle cadminum rechargeable battery which serves as a self-contained power supply for the timer circuit, insensitive to external noise or voltage variation, thereby assuring that the timer when set to a given time, will not fire prematurely. With the component values indicated, the total drain on the battery while it is undergoing its timing cycle is not more than ten milliamps.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with an interval timer circuit, power supply means therefor including a rechargeable battery connected in series with a normally closed first switch section and a rectifier, a pair of external supply terminals, said battery, first switch section and rectifier being connected across said external supply terminals for constantly recharging said battery, and means operatively connected to one of said pair of external supply terminals and responsive to the application of a starting pulse to open said first switch section and close a normally open second switch section connecting said battery across the timer circuit for discharge only during the predetermined timing interval, said starting pulse responsive means including a first relay coil, said first switch section movable to an open position in response to the energization of said first coil for disconnecting said battery from one of said pair of external supply terminals, said second switch section movable to a closed position in response to the energization of said first coil for connecting said battery to the timer circuit.

2. The combination of claim 1 including a second relay coil electrically connected to said timer circuit, and a normally open third switch section movable to a closed position in response to the energization of said first coil, connected in series with said second coil for energization thereof after said predetermined timing interval.

3. The combination of claim 2 including a normally open fourth switch section movable to a closed position for holding said second coil energized in response to the energization of said second coil and connected in series with said second coil between said external supply terminals.

4. The combination of claim 3 including a series branch operatively connected to the battery and comprising a rectifier and said fourth switch section connected in parallel with said first switch section for resuming recharging of the battery following said predetermined timing intervals.

5. The combination of claim 3 including an output circuit having a fifth switch section connected therein responsive to the energization of said second coil.

6. The combination of claim 4 including an output circuit having a fifth switch section connected therein responsive to the energization of said second coil.

7. The combination of claim 5 wherein all of said aforementioned elements are completely embedded in an insulative housing.

8. The combination of claim 5 wherein all of said aforementioned elements are electrically connected and physically mounted on a printed board, said board and said elements being completely embedded in an insulative housing, and external circuit pins extending from said housing to which said external supply terminals, starting pulse responsive means and output circuit are connected.

9. In combination with an internal timer circuit having a timing cycle, energy storing means operatively connected to said timer circuit for discharge only during said timing cycle to apply a non-fluctuating voltage to the timer circuit, external power supply means operatively connected to said energy storing means for constant charging thereof except during a predetermined timing interval established by the timer circuit when energized, input signal responsive means operatively connected to said energy storing means and external power supply means operative to simultaneously disconnect said external power supply means from the energy storing means and connect the timer circuit to the energy storing means to initiate said timing cycle, relay control means operatively connected to the input signal responsive means and the timer circuit and conditioned by the input signal responsive means for energization by the external power supply means following said predetermined timing interval to reestablish charging of the energy storing means by the external power supply means and external circuit control means operated in response to energization of the relay control means.

10. The combination of claim 9, wherein said input signal responsive means comprises signal switch actuating means, conditioning switch means operatively connected to the timer circuit and relay control means for simultaneously maintaining said timer circuit and relay control means inoperative and actuated by the switch actuating means to operatively condition said timer circuit and relay control means, and charge controlling switch means actuated by the switch actuating means simultaneously with said conditioning switch means to connect the energy storing means to the timer circuit.

11. The combination of claim 10, wherein said energy storing means comprises, rechargeable battery means and charging circuit means operatively connected to the battery means unidirectionally limiting current flow through the battery means to a trickle value, said charging circuit means being alternatively connected to the external power supply means alone and the timer circuit alone by the input signal responsive means and simultaneously connected to both the external power supply means and the timer circuit by the relay control means.

12. The combination of claim 11 wherein said relay control means includes relay switch means rendered operative by the timer circuit to establish a relay holding circuit for maintaining the relay control means energized and a unidirectional connection to the energy storing means.

13. The combination of claim 9 wherein said energy storing means comprises, rechargeable battery means, and charging circuit means operatively connected to the battery means unidirectionally limiting current flow through the battery means to a trickle value, said charging circuit means being alternatively connected to the external power supply means alone and the timer circuit alone by the input signal responsive means and simultaneously connected to both the external power supply means and the timer circuit by the relay control means.

14. The combination of claim 9 wherein said relay control means includes relay switch means rendered operative by the timer circuit to establish a relay holding circuit for maintaining the relay control means energized and a unidirectional connection to the energy storing means.

15. In combination with a switching control system having a fluctuating power supply and power operated controls, a rechargeable source of potential adapted to actuate the switching control system by discharge during a predetermined interval, means for continuously maintaining said rechargeable source of potential in a charged condition by a trickle flow of current from the power supply, charge interrupting means operative only during said discharge from the rechargeable source of potential to interrupt charging thereof to prevent actuation of the switching control system by a fluctuating voltage from the power supply, and means responsive to said actuation of the switching control system for maintaining the power operated controls thereof energized thereafter only by the power supply.

16. The combination of claim 15, wherein said means for continuously maintaining said rechargeable source of potential in a charged condition comprises, voltage dropping means operatively connecting said power supply to the rechargeable source of potential through the charge interrupting means for limiting the charging rate to said trickle flow of current, by-pass switch means operative immediately following said predetermined interval to reestablish charging of the rechargeable source of potential by the power supply and unidirectional current control means operatively connected to the rechargeable source of potential for preventing discharge therefrom before and after said predetermined interval due to fluctuations of said power supply.

References Cited in the file of this patent
UNITED STATES PATENTS

| | | |
|---|---|---|
| 2,549,854 | Salazar | Apr. 24, 1951 |
| 2,735,966 | Dodd | Feb. 21, 1956 |
| 2,887,592 | Stout et al. | May 19, 1959 |
| 2,889,472 | Meyers | July 2, 1959 |
| 2,963,596 | Bross | Dec. 6, 1960 |
| 3,039,177 | Burdett | June 19, 1962 |
| 3,043,989 | Nash et al. | July 10, 1962 |